(12) United States Patent
Oliver et al.

(10) Patent No.: US 9,069,845 B2
(45) Date of Patent: Jun. 30, 2015

(54) PERSONALIZED ELECTRONIC-MAIL DELIVERY

(75) Inventors: Jonathan Oliver, Oakland, CA (US);
Rohan Baxter, Oakland, CA (US);
Wray Buntine, Oakland, CA (US);
Steven Waterhouse, San Francisco, CA (US)

(73) Assignee: Dell Software Inc., Round Rock, TX (US)

( * ) Notice: Subject to any disclaimer, the term of this patent is extended or adjusted under 35 U.S.C. 154(b) by 1656 days.

(21) Appl. No.: 11/589,007

(22) Filed: Oct. 27, 2006

(65) Prior Publication Data

US 2007/0043817 A1 Feb. 22, 2007

Related U.S. Application Data

(63) Continuation of application No. 09/361,678, filed on Jul. 27, 1999, now Pat. No. 7,158,986.

(51) Int. Cl.
*G06F 7/00* (2006.01)
*G06F 17/30* (2006.01)

(52) U.S. Cl.
CPC .... *G06F 17/30702* (2013.01); *G06F 17/30867* (2013.01); *Y10S 707/99931* (2013.01); *Y10S 707/99943* (2013.01)

(58) Field of Classification Search
USPC ............. 707/104.1, 100, 10, 5, 7, 783, 784
See application file for complete search history.

(56) References Cited

U.S. PATENT DOCUMENTS

| | | |
|---|---|---|
| 5,164,897 A | 11/1992 | Clark et al. |
| 5,519,857 A | 5/1996 | Kato et al. |
| 5,598,557 A | 1/1997 | Doner et al. |
| 5,659,766 A | 8/1997 | Saund et al. |
| 5,727,129 A | 3/1998 | Barrett et al. |
| 5,754,938 A | 5/1998 | Herz et al. |
| 5,754,939 A | 5/1998 | Herz et al. |

(Continued)

FOREIGN PATENT DOCUMENTS

| | | |
|---|---|---|
| WO | WO 98/53624 | 11/1998 |
| WO | WO 98/57490 | 12/1998 |

(Continued)

OTHER PUBLICATIONS

U.S. Appl. No. 13/460,774 Office Action mailed Sep. 29, 2014.

(Continued)

*Primary Examiner* — Hosain Alam
*Assistant Examiner* — Eliyah S Harper
(74) *Attorney, Agent, or Firm* — Lewis Roca Rothgerber LLP

(57) ABSTRACT

Personalized electronic-mail delivery is disclosed. The content of incoming electronic-mail messages is identified. Determinations may be made with respect to whether the content of the incoming electronic-mail messages corresponds to a user profile. The user profile may indicate one or more user preferences of a particular user with respect to incoming electronic-mail messages. If the incoming electronic-mail messages correspond to the one or more user preferences indicated in the user profile, the electronic-mail messages may be delivered to an electronic-mail server. The electronic-mail messages may then be displayed to the user via a list of electronic-mail messages reflective of those messages that are stored at the electronic-mail server and accessible to the end-user.

14 Claims, 7 Drawing Sheets

(56) References Cited

U.S. PATENT DOCUMENTS

| | | | |
|---|---|---|---|
| 5,787,421 | A | 7/1998 | Nomiyama |
| 5,796,952 | A | 8/1998 | Davis et al. |
| 5,854,630 | A | 12/1998 | Nielsen |
| 5,857,179 | A | 1/1999 | Vaithyanathan et al. |
| 5,867,799 | A | 2/1999 | Lang et al. |
| 5,913,215 | A | 6/1999 | Rubinstein et al. |
| 5,978,799 | A | 11/1999 | Hirsch |
| 6,029,141 | A | 2/2000 | Bezos et al. |
| 6,078,914 | A | 6/2000 | Redfern |
| 6,078,918 | A | 6/2000 | Allen et al. |
| 6,115,709 | A | 9/2000 | Gilmour et al. |
| 6,125,173 | A | 9/2000 | Jagadish et al. |
| 6,154,783 | A | 11/2000 | Gilmour et al. |
| 6,167,397 | A | 12/2000 | Jacobson et al. |
| 6,202,083 | B1 | 3/2001 | Chrabaszcz |
| 6,236,975 | B1 | 5/2001 | Boe et al. |
| 6,249,795 | B1 | 6/2001 | Douglis |
| 6,314,420 | B1 | 11/2001 | Lang et al. |
| 6,317,722 | B1 | 11/2001 | Jacobi et al. |
| 6,345,293 | B1 | 2/2002 | Chaddha |
| 6,366,956 | B1 | 4/2002 | Krishnan |
| 6,401,096 | B1 | 6/2002 | Zellweger |
| 6,411,924 | B1 | 6/2002 | de Hita et al. |
| 6,480,885 | B1 | 11/2002 | Olivier |
| 6,484,149 | B1 | 11/2002 | Jammes et al. |
| 6,493,702 | B1 | 12/2002 | Adar et al. |
| 6,542,905 | B1 | 4/2003 | Fogel et al. |
| 6,567,800 | B1 | 5/2003 | Barrera |
| 6,633,868 | B1 | 10/2003 | Min |
| 6,654,735 | B1 * | 11/2003 | Eichstaedt et al. ............. 707/3 |
| 6,654,787 | B1 * | 11/2003 | Aronson et al. ............ 709/206 |
| 6,692,359 | B1 | 2/2004 | Williams et al. |
| 6,718,365 | B1 | 4/2004 | Dutta |
| 6,801,929 | B1 | 10/2004 | Donoho et al. |
| 6,845,374 | B1 | 1/2005 | Oliver et al. |
| 6,859,800 | B1 | 2/2005 | Roche et al. |
| 7,065,497 | B1 * | 6/2006 | Brewster et al. .......... 705/14.61 |
| 7,158,986 | B1 | 1/2007 | Oliver et al. |
| 7,388,950 | B2 * | 6/2008 | Elsey et al. ............. 379/201.02 |
| 7,451,388 | B1 | 11/2008 | Henzinger |
| 7,644,075 | B2 | 1/2010 | Zeng et al. |
| 7,680,819 | B1 * | 3/2010 | Mellmer et al. ............. 707/783 |
| 8,412,780 | B2 * | 4/2013 | Fox et al. ..................... 709/206 |
| 8,645,389 | B2 | 2/2014 | Oliver |
| 2002/0038357 | A1 | 3/2002 | Haverstock et al. |
| 2002/0116378 | A1 | 8/2002 | Zhai |
| 2002/0152463 | A1 * | 10/2002 | Dudkiewicz ................... 725/46 |
| 2003/0046270 | A1 | 3/2003 | Leung et al. |
| 2004/0193691 | A1 * | 9/2004 | Chang .......................... 709/206 |
| 2004/0230598 | A1 | 11/2004 | Robertson et al. |
| 2005/0081139 | A1 | 4/2005 | Witwer et al. |
| 2008/0189253 | A1 | 8/2008 | Oliver et al. |
| 2009/0089272 | A1 | 4/2009 | Oliver et al. |
| 2012/0215868 | A1 | 8/2012 | Oliver et al. |
| 2014/0214821 | A1 | 7/2014 | Oliver |

FOREIGN PATENT DOCUMENTS

| | | |
|---|---|---|
| WO | WO 99/32985 | 7/1999 |
| WO | WO 00/30010 | 5/2000 |
| WO | WO 02/065327 | 8/2002 |
| WO | WO 2004/052010 | 6/2004 |

OTHER PUBLICATIONS

U.S. Appl. No. 13/460,774 Office Action mailed Sep. 6, 2013.
U.S. Appl. No. 13/460,774 Office Action mailed Apr. 8, 2013.
U.S. Appl. No. 11/003,920 Final Office Action mailed May 31, 2013.
U.S. Appl. No. 11/003,920 Office Action mailed Feb. 20, 2013.
Yuwono et al., "Search and Ranking Algorithms for Locating Resources on the World Wide Web," Data Engineering, Feb. 26-Mar. 1996, pp. 164-171.
U.S. Appl. No. 13/460,774 Office Action mailed Nov. 1, 2012.
U.S. Appl. No. 11/003,920 Office Action mailed Aug. 24, 2012.
U.S. Appl. No. 11/003,920 Final Office Action mailed Dec. 14, 2010.
U.S. Appl. No. 11/003,920 Office Action mailed Jul. 9, 2010.
U.S. Appl. No. 11/003,920 Advisory Action mailed Feb. 18, 2010.
U.S. Appl. No. 11/003,920 Final Office Action mailed Jan. 14, 2010.
U.S. Appl. No. 11/003,920 Final Office Action mailed Nov. 20, 2009.
U.S. Appl. No. 11/003,920 Office Action mailed Jul. 17, 2009.
U.S. Appl. No. 11/003,920 Office Action mailed May 20, 2009.
U.S. Appl. No. 11/927,450 Final Office Action mailed Nov. 1, 2010.
U.S. Appl. No. 11/927,450 Office Action mailed May 26, 2010.
U.S. Appl. No. 11/927,450 Office Action mailed Dec. 8, 2009.
U.S. Appl. No. 13/460,774 Final Office Action mailed Feb. 11, 2014.
John S. Breese et al., "Empirical Analysis of Predictive Algorithms for Collaborative Filtering," Proceedings of the Fourteenth Conference on Uncertainty of Artificial Intelligence, Jul. 1998, 10pp.
Yonatan Aumann et al., "Predicting Event Sequences: Data Mining for Prefetching Web-Pages," Abstract, 1998, pp. 1-10.
Andrew McCallum et al., "A Comparison of Event Models for Naive Bayes Text Classification," In the Proc. of the AAAI'98 Workshop on Learning for Text Categorization, 1998, 8pp.
Myra Spiliopoulou, "The Laborious Way from Data Mining to Web Log Mining," Institut fur Wirtschaftsinformatik, Humboldt-Universitat zu Berlin, pp. 1-21.
Oren Zamir et al., "Fast Intuitive Clustering of Web Documents," Department of Computer Science & Engineering, Univ. of Washington, American Association for Artificial Intelligence, 1997, 4 pp.
Press Release; URL=http://www.netperceptions.com/press/release/pr_19990423.html, Apr. 23, 1999.
Press Release, URL=http://www.netperceptions.com/press/release/pr_19981105_2.html, Nov. 5, 1998.
Data Sheet, Portal-In-A-Box™, "Autonomy's Automated Online Information Portal," Autonomy, Inc., 1999, 4 pp., URL=www.autonomy.com.
Data Sheet, Portal-In-A-Box™, "Autonomy's Automated Online Information Portal," Product Features, Autonomy, Inc., 1 pp., URL=www.autonomy.com.
Data Sheet, Portal-In-A-Box™, "Product Features," Autonomy, Inc., 4 pp., URL=www.autonomy.com.
Portal-In-A-Box™, Product Overview, Autonomy, Inc., 1 pp., URL=www.autonomy.com.
New Media, "Bringing Full Automation and True Personalization to New Media Publishing," Autonomy, Inc., 8 pp., URL=www.autonomy.com.
"Autonomy, Technology White Paper", Autonomy, Inc., 1998, 19 pp.
Deborah Kania, "Putting Personalization to the Test," URL=http://www.searchz.com/Articles/0302991.html, 1999, pp. 1-7.
David S. Linthicum, "Using Personalization to Make Sites more Profitable," URL=http://www.ZDENT.com/computershopper/edit/cshopper/content/9903/387616.html, Mar. 1999, pp. 1-4.
Sharon Machlis, "Low Tech Marketing," URL=http://www.computerworld.com/home/print.nsf/a11/9902018D, Feb. 1, 1999, pp. 1-2.
Scot Petersen, "Upgrade Strengthens Net.Analysis," PC Week Online, URL=wysiwyg://12//http://www.zdnet.com/pcweek.stories/news/0,4153,385022,00.html, Jan. 18, 1999, pp. 1-2.
Dana Blankenhorn, "Up Close and Personal, Finding the Right Tools for Customization Web Content," Net Perceptions: Press-Release, New Media, Nov. 24, 1997, 2pp. URL=www.newmedia.com/newmedia/97/15/buyersguide/personal_web_content.html.
Gustos Software, LLC, "Find Anything You Like Today?" 1996-1997, 10 pp.
Jesse Berst, "Why Personalization is the Internet's Next Big Thing," Apr. 14, 1998, 3 pp. URL=www.zdnet.com/anchordesk/story/story_1977.html.
Whit Andrews, "Personalized Agents Enable Preferred Surfing," Web Week, vol. 2, Issue 12, Aug. 19, 1996, 2pp.
Matt Carmichael, "Survey of Developers Shows How Much it Costs to Add Personalization to Sites," CNET, Inc., URL=www.net2b.com/cgu_bci/print_article.nt/article.nt/article/887, 1995-1997, 3 pp.
Richard Dean, "Personalizing your Web Site," Jun. 2, 1998, 2 pp., URL=www.builder.com/business/personal/index.html.
Harris Kravatz, "Taking Portals Personally: A Design Review," Webreview.com, Apr. 30, 1999, 2pp.
Bowne Internet Solution, "Personalization," 8pp.

(56) References Cited

OTHER PUBLICATIONS

E-commerce News, "e2 Software Helps 'Amazonify' E-Commerce Web Sites," Jun. 2, 1999, 5pp.
E-commerce News, "Consumer E-Commerce Segment to Increase to $26 Billion by Year 2002," May 19, 1998, 5pp. URL=www.e2software.com.
Netscape Netcenter, "What's Related FAQ," 1999, 6pp.
About Alta Vista; "Our Technology," 1999, 2pp.
Product Datasheet, The Open Sesame Profiling Server, 2pp.
Philip Chan, "A Non-Invasive Learning Approach to Building Web User Profiles," Computer Science, Florida Institute of Technology, 6 pp.
Bjornar Larsen, et al., "Fast and Effective Text Mining Using Linear-Time Document Clustering," SRA International, Inc. pp. 16-22.
Susan Dumais, et al., "Inductive Learning Algorithms and Representations for Text Categorization ," Microsoft Research and Computer Science Department, Stanford University, 8pp.
Marko Balabanovic, et al., "An Adaptive Agent for Automated Web Browsing," Department of Computer Science, Stanford University, Digital Library Project, Working Paper SIDL-WP1995-0023, 1995, pp. 1-12.
Lee Sherman, "Practice Classified Information-Autonomy Agentware allows News Corp.'s LineOne to Create Real-Time Custom News," Knowledge Management, Nov. 1998, 4pp.
Lumeria, "An Infomediary Approach to the Privacy Problem," 22pp.
Bowne Internet Solutions, "Open Sesame Technical White Paper," 1999, pp. 1-26.
Engage Technologies, Inc., "ProfileServer 4.0—Maximize the Internet Power of the Internet with Personalized Marketing Strategies," 1998-1999, 2pp.
eHNC Software, Inc., "The Power Wallet-A Whitepaper on PowerWallet Technology," Jul. 14, 1999, pp. 1-9.
e2 Software Corporation, "1-to-1 Web Site Services-Hosted Internet Contact and Email Communication Services," 1999, 4 pp.
John Lalande, "Web Sites Get Personal-Customize Popular Pages To Reflect Your Interests," Smart Computing, Jul. 1999, vol. 10, Issue 7, pp. 84-87.
Reva Basch, "Cutting Through the Clutter-Master Search Engines to Find Exactly the Web Content You Need," Smart Computing, Jul. 1999, vol. 10, Issue 7, pp. 88-91.
Shumeet Baluja, et al., "Applying Machine Learning for High Performance Named-Entity Extraction," Pacific Association for Computational Linguistics, 1999, pp. 1-14.
Marko Grobelnik, et al., "Learning Machine: Design and Implementation," Department for Intelligent Systems, J. Stefan Institute, Ljubljana, Slovenia,1998, pp. 1-8.
Dunja Mladenic, "Personal Web Watcher: Design and Implementation," Department for Intelligent Systems, J. Stefan Institute , Ljubljana, Slovenia, 1996, pp. 1-18.
Net Perceptions, "1 to 1 Marketing the 'Internet and Privacy," Software Development Forum commerce SIG, Jun. 29, 1999, 19 pp.
Intraware Presentation, "Personalized Ecommerce and Content Managment," Jun. 10, 1999, 9pp.
GuestTrack, Inc. Product Overview, "Web Personalization Software," 1996-1999, 9pp.
Gustos Software, LLC, "Gustos Guide," 1996-1997, 9pp.
Personify, Inc., "What is Personify," 1999, 1pp.
Responsys.com, "Power Your E-customer Interaction with Responsys Interact," 1999, 4pp.
eHNC Software, Inc., "SelectCast," 1999, 2pp.
Julie Keslik, et al., "Inktomi Introduces First Customizable, Automated Directory Engine," 1999, 3pp.
CNET Builder.com, "Personalizing Your Web Site-Degrees of Personalization," 1995-1999, 3pp.
CNET, Inc., "Personalizing Your Web Site-What is Personalization?" 1995-1999, 2pp.
Qi et al., "Efficient Profile Matching for Large Scale Webcasting, Computer Networks and ISDN Systems," 30, 1998, pp. 443-455.
Hidekazu S., et al., "Learning Personal Preferences on Online Newspaper Articles from User Behaviors, Computer Networks and ISDN Systems," 29, 1997, pp. 1447-1455.
Christian K., et al., WebAssist: a User Profile Specific Information Retrival Assistant, Short Paper, Computer Networks and ISDN Systems, 30, 1998, pp. 654-655.
Sung-Shun Weng, et al., "Personalized Product Recommendation in E-Commerce," e-Technology, e-Commerce and e-Service, IEEE 2004, Mar. 2004, pp. 413-420.
Yi-Hung Wu, et al., "Enabling Personalized Recommendation on the Web Based Interests and Behaviors," Research Issues in Data Engineering, 2001 Proceedings, Workshop, Apr. 2001, pp. 17-24.
Ambak, J.C., et al., "Graphical Correspondence in Electronic-Mail Networks Using Personal Computers," Selected Areas in Communications, IEEE Journal, vol. 7, Issue 2, 1989, pp. 257-267.
Chan, P., "A Non-Invasive Learning Approach to Building Web User Profiles," Workshop on Web Usage Analysis and User Profiling, In the Proc. of the Fifth Int'l Conf. on Knowledge Discovery and Data Mining, San Diego, CA, 1999 6 pp.
Larsen, B. et al., "Fast and Effective Text Mining Using Linear-Time Document Clustering," In the Proc. of the 5th Int'l Conf. on Knowledge Discovery and Data Mining, San Diego, CA, 1999, pp. 16-22, 1999.
Dumais, S. et al., "Inductive Learning Algorithms and Representations for Text Categorization," In the Proc. of the 7th Int'l Conf. on Information and Knowledge Management, Nov. 1998, 8 pp.
Labalme, F. et al., "An Infomediary Approach to the Privacy Problem," Feb. 9, 1999, 24 pp., located at www.broadcatch.com/lumeria/paper1/.
Spiliopoulou, M., "The Laborious Way from Data Mining to Web Log Mining," Appeared in the Journal of Computer Systems Science and Engineering, Special Issue on Semantics of the Web, Mar. 1999.
U.S. Appl. No. 14/172,731 Office Action mailed Sep. 10, 2014.
U.S. Appl. No. 13/460,774 Final Office Action mailed Apr. 16, 2015.
U.S. Appl. No. 11/927,450 Decision on Appeal mailed Mar. 27, 2015.
U.S. Appl. No. 14/172,731 Notice of Allowance mailed Apr. 1, 2015.

* cited by examiner

My Personalized Auction Site - My History

Click here for My Recommended Page

Welcome to My Auction Site. We've presented auctions below which you have previously browsed.

My History

| My Interest Folder 0 Keywords: oak furniture | Item(s) | Price | # Bids | Time Auction Ends |
|---|---|---|---|---|
| | 4 solid oak antique chairs. | 320.00 | 0 | 4 days, 18 hours + |
| | Oak Hall seat | 200.00 | 0 | 6 days, 19 hours + |
| | Rare Old Oak Watch Crystal Cabinet | 95.00 | 0 | 6 days, 20 hours + |

| My Interest Folder 1 Keywords: coin roman ancient silver postage | Item(s) | Price | # Bids | Time Auction Ends |
|---|---|---|---|---|
| | L R G Roman SILVER Coin-98 AD-Rome's Golden Era | 24.95 | 3 | 3 days, 3 hours + |
| | 1,250 UNCLEANED ANCIENT ROMAN COINS CHEAP!!!! | 0.65 | 11 | 4 days, 23 hours + |
| | ROMAN COIN-60 AD. Emperor NERO !! Famos !!! | 18.95 | 3 | 5 days, 3 hours + |
| | Roman SILVER Coin- 200AD- Empress & Peacock!!! | 9.95 | 1 | 6 days, 20 hours + |

FIG. 6

| My Personalized Auction Site - My Recommended Auctions | | | | |
|---|---|---|---|---|
| Click here for My History Page | | | | |
| Welcome to My Auction Site! - now personalized to you. We've presented auctions below which we hope you will find relevant to your interests. | | | | |
| 5 Recommended Auctions from each interest folder | | | | |

700

602 — My Interest Folder 0

| Item(s) | Price | # Bids | Time Auction Ends |
|---|---|---|---|
| GREAT 12 DRAWER OAK FILE CABINET — 610 | 50.00 | 0 | 6 days, 17 hours + |
| Old oak Infant/Toddler Sit-In Rocker — 610 | 5.00 | 0 | 6 days, 6 hours + |
| Old Solid Redwood Adirondack Chairs | 50.00 | 0 | 6 days, 16 hours + |
| Antique chair--take a look! | 11.00 | 1 | 6 days, 16 hours + |
| Antique Furniture: Explained and Illustrated | 5.00 | 0 | 6 days, 17 hours + |

604 — My Interest Folder 1

| Item(s) | Price | # Bids | Time Auction Ends |
|---|---|---|---|
| Roman SILVER Coin-240 AD. Military Theme !! | 18.95 | 4 | 1 days, 3 hours + |
| ROMAN COIN-365 AD | 9.95 | 18 | 1 days, 4 hours + |
| Roman SILVER Coin-250 AD. ARMY in KOSOVO !! | 19.95 | 12 | 2 days, 3 hours + |
| Greek SILVER Coin-320 BC. Alexander the Great | 49.95 | 10 | 4 days, 4 hours + |
| SILVER Coin-1st Cent BC. Roma/Chariot !! LOOK | 24.95 | 7 | 3 hours, 23 mins + |

FIG. 7

PERSONALIZED ELECTRONIC-MAIL DELIVERY

CROSS-REFERENCE TO RELATED APPLICATIONS

The present application is a continuation and claims the priority benefit of U.S. patent application Ser. No. 09/361,678 filed Jul. 27, 1999, which is now U.S. Pat. No. 7,158,986. The disclosure of this commonly owned application is incorporated herein by reference.

BACKGROUND OF THE INVENTION

1. Field of the Invention

The present invention relates generally to a method and system for creating a personalized display for a user of an electronic network. More specifically, the present invention relates to a method and system for determining a user's interests from the content of electronic documents viewed by the user and providing recommended documents and recommendation packages to a user based upon the determined interests.

2. Description of the Related Art

The number of Internet users continues to increase at an explosive rate. The World Wide Web ("Web") has therefore now become a significant source of information, as well as products and services. As the numbers of Web users rise, Internet commerce ("e-commerce") companies, and content providers are increasingly searching for strategies to target their information, products and services to those Web users. One technique that is currently being used to provide Web users with more relevant and timely information is "personalization."

Personalization can include sending a user an e-mail message tailored to that user, or providing customized Web pages that display information selected by, or considered of interest to the user. Personal merchandising, in which a unique view of an online store, featuring offerings targeted by customer profile is displayed, is another effective personalization technique. Personalization facilitates the targeting of relevant data to a select audience and can be a critical factor in determining the financial success of a Web site.

Internet companies wishing to create highly personalized sites are currently poorly served by both personalization technology vendors and customer relationship marketing product vendors. Each of these vendors offers only part of the overall solution. In addition, a significant investment of time and resources by the client is required to deploy these current solutions.

Most prior art personalization and Web user behavior (also known as click stream) analysis technologies maintain a record of select Web pages that are viewed by users. This record, known as the "Web log" records which users looked at which Web pages in the site. A typical Web log entry includes some form of user identifier, such as an IP address, a cookie ID or a session ID, as well as the Uniform Resource Locator ("URL") the user requested, e.g. "index.html." Additional information such as the time the user requested the page or the page from which the user linked to the current Web page can also be stored in the Web log.

Traditionally, such data has been collected in the file system of a Web server and analyzed using software, such as that sold by WebTrends and Andromedia. These analyses produce charts displaying information such as the number of page requests per day or the most visited pages. No analysis is performed of the internal Web page structure or content. Rather, this software relies on simple aggregations and summarizations of page requests.

The prior art personalization methods also rely on the use of Web logs. One technology used in prior art personalization methods is the trend analysis method known as collaborative filtering. Examples of collaborative filtering systems are those of Net Perceptions (used for Amazon.com's book recommendations), Microsoft's Firefly, Personify, Inc., and HNC Software Inc.'s eHNC.

One method of collaborative filtering is trend analysis. In trend analysis collaborative filtering, the pages requested by a user are noted, and other users that have made similar requests are identified. Additional Web pages that these other users have requested are then recommended to the user. For example, if User A bought books 1 and 2 from an on-line bookseller, a collaborative filtering system would find other users who had also bought books 1 and 2. The collaborative filtering system locates 10 other users who on average also bought books 3 or 4. Based upon this information, books 3 and 4 would be recommended to User A.

Another type of collaborative filtering asks the users to rank their interest in a document or product. The answers to the questions form a user profile. The documents or products viewed by other users with a similar user profile are then recommended to the user. Systems using this technique include Reel.com's recommendation system. However, collaborative filtering is not an effective strategy for personalizing dynamic content. As an example, each auction of a Web-based auction site is new and therefore there is no logged history of previous users to which the collaborative filtering can be applied. In addition, collaborative filtering is not very effective for use with infrequently viewed pages or infrequently purchased products.

Another technique used to personalize Internet content is to ask the users to rank their interests in a document. Recommendations are then made by finding documents similar in proximity and in content to those in which the user has indicated interest. These systems may use an artificial intelligence technique called incremental learning to update and improve the recommendations based on further user feedback. Systems using this technique include SiteHelper, Syskill & Webert, Fab, Libra, and WebWatcher.

Another technique that has been used to personalize Internet content is link analysis. Link analysis is used by such systems as the search engine Direct Hit and Amazon.com's Alexa®. The prior art link analysis systems are similar to the trend analysis collaborative filtering systems discussed previously. In the link analysis systems, however, the URL of a web page is used as the basis for determining user recommendations.

Other prior art personalization methods use content analysis to derive inferences about a user's interests. One such content analysis system is distributed by the Vignette Corporation. In the content analysis method, pages on a client's Web site are tagged with descriptive keywords. These tags permit the content analysis system to track the Web page viewing history of each user of the Web site. A list of keywords associated with the user is then obtained by determining the most frequently occurring keywords from the user's history. The content analysis system searches for pages that have the same keywords for recommendation to the user.

This prior art content analysis systems is subject to several disadvantages. First, tagging each page on the client's Web site requires human intervention. This process is time-consuming and subject to human error. The prior art content analysis systems can only offer recommendations from predefined categories. Furthermore, the prior art content analysis' systems require a user to visit the client's Web site several times before sufficient data has been obtained to perform an analysis of the user's Web page viewing history.

Other prior art content analysis systems automatically parse the current document and represent it as a bag of words. The systems then search for other similar documents and recommend the located documents to the user. Such systems include Letizia and Remembrance Agent. These content analysis systems base their recommendations only on the current document. The content of the documents in the user's viewing history are not used.

Many Web sites offer configurable start pages for their users. Examples of configurable start pages include My Yahoo! and My Excite. To personalize a start page using the prior art method, the user fills in a form describing the user's interests. The user also selects areas of interest from predefined categories. The user's personalized start page is then configured to display recommendations such as Web pages and content-based information that match the selected categories.

This prior art method, however, is not automated. Rather, the user's active participation is required to generate the personalized Web start page. Furthermore, pages on the client's Web site must be tagged to be available as a recommendation to the user. In addition, recommendations can only be offered from predefined categories. Thus, the prior art personalized start pages may not provide relevant content to users who have eclectic interests or who are not aware of or motivated to actively create a personalized start page.

Content Web sites are increasingly generating income by using advertising directed at users of the Web sites. In the prior art, advertising was targeted to users by using title keywords. In this method, keywords in the title of a Web page or otherwise specified by the author of the page are compared with the keywords specified for a particular advertisement. Another technique used is to associate specific ads with categories in a Web site. For example, advertisements for toys might be associated with Web site categories related to parenting. However, these prior art methods require human intervention to select the keywords or to determine the associations of advertisements with particular categories. Furthermore, the prior art methods cannot readily be used to target advertisements to dynamic content.

It would therefore be an advantage to provide a method and system for providing Internet end users with relevant and timely information that is rapid to deploy, easy and inexpensive for client Web sites to use. It would be a further advantage if such method and system were available to automatically and dynamically determine the interests of a user and recommend relevant content to the user. It would be yet another advantage if such method and system were available to provide for a user a personalized recommendation package, such as an automatically generated start page for each user who visits a Web site.

SUMMARY OF THE INVENTION

In one exemplary embodiment of the present invention, a personalized electronic-mail delivery system is disclosed. The system includes an electronic-mail server and a client computing device. The client computing device may be configured for displaying electronic-mail messages stored at the electronic-mail server and accessible to an end-user of the client device. The system further includes a gateway appliance coupled to the electronic-mail server. The gateway appliance processes incoming electronic-mail messages utilizing a filter to identify content of the incoming electronic-mail messages. The filter determines whether the content of the incoming electronic-mail messages corresponds to a user profile indicating one or more user preferences and, if the incoming electronic-mail messages correspond to the one or more user preferences indicated in the user profile, the gateway appliance delivers the electronic-mail message to the electronic-mail server. The electronic-mail message may then be displayed in a list of electronic-mail messages that are stored at the electronic-mail server and accessible to the end-user.

In some embodiments of the aforementioned system, a tracking module at the gateway appliance may identify an end-user request for a particular electronic-mail message stored at the electronic-mail server. Information concerning end-user requests may be stored in a database. Further, the tracking module may associate the information concerning end-user requests for particular electronic-mail messages with a user profile. Alternatively, some embodiments will have the tracking module assign document identifiers to electronic-mail messages. Information concerning end-user interactions with a particular electronic-mail message may be stored in a database, the particular electronic-mail message being identified by its document identifier.

In some instances, the filter at the gateway appliance of the aforementioned system identifies the content of the incoming electronic-mail message through identification of one or more keywords. These keywords may correspond to one or more user preferences indicated by the user profile. The filter may further identify the content of the incoming electronic-mail message through removal of information irrelevant to the content of the incoming electronic-mail message.

Another exemplary embodiment of the present invention provides a gateway apparatus for filtering electronic-mail messages according to a theme or concept of the electronic-mail messages. The gateway apparatus includes a network interface for receiving incoming electronic-mail messages. A filter identifies the contents of the incoming electronic-mail messages. The filter further determines whether the contents of the incoming electronic-mail messages correspond to a user profile indicating one or more user preferences reflected in the content of the incoming electronic-mail message. A second network interface transfers the incoming electronic-mail messages to an electronic-mail server if the incoming electronic-mail messages correspond to the one or more user preferences indicated in the user profile. Those electronic-mail messages may then be displayed and made accessible to an end-user at a client device coupled to the electronic-mail server.

The gateway apparatus may also include an updateable storage device. In some instances, the filter may be a customizable filter stored in the updateable storage device. The user profile may also be customizable and stored in the updateable storage device.

A further embodiment of the present invention provides a computer-readable medium having embodied thereon a program. The program may be executable by a processor to perform a method for personalized electronic-mail delivery. Through this method, an incoming electronic-mail message is received. The contents of the received message are identified and a determination is made as to whether the contents of the incoming electronic-mail message correspond to a user profile indicating one or more user preferences for the content of the incoming electronic-mail message. Electronic-mail messages are then delivered to an electronic-mail server if the contents of the incoming electronic-mail message correspond to the one or more user preferences in the user profile. The incoming electronic-mail message may then be displayed to an end-user accessing the electronic-mail server via a client computing device configured to display a list of electronic-mail messages that are stored at the electronic-mail server and accessible by the end-user.

In yet another embodiment of the present invention, a method for processing end-user behavior in an electronic-mail network and for effectuating personalized delivery of electronic-mail is disclosed. Through the method, a database entry for a user of an electronic-mail server is created. Requests by the user for access to one or more electronic-mail messages stored at the electronic-mail server are tracked and information is then stored in the database entry for the user. That information may regard the user requests for access to the one or more electronic-mail messages and may comprise content information derived from filtering of the one or more electronic-mail messages for which the user requested access.

In some embodiments, content information may be derived from textual information in the electronic-mail message or from graphics in the electronic-mail message. Filtering may include extracting structure information, extracting theme or concept related keywords, or terms irrelevant to the theme or concept of a message. Further, a user profile may be developed for a user and that indicates at least one preference of the user. As a result of the profile, only those future electronic-mail messages that comprise content that corresponds to the at least one preference of the user as reflected by the user profile may be displayed to the user.

BRIEF DESCRIPTION OF THE DRAWINGS

FIG. 6 is an example of a user profile generated by the recommendation software, according to the preferred embodiment of the present invention.

FIG. 7 is an example of a recommendation start page according to the preferred embodiment of the present invention.

DETAILED DESCRIPTION

The present invention is a computer-implemented method and system for creating a personalized display for a user of an electronic network. The method can be used with any electronic network including the Internet and, more specifically, the World Wide Web. The preferred embodiment of the present invention includes components for analyzing Web user behavior, for remote user tracking, and for interacting with the user.

In the following description, for purposes of explanation, numerous specific details are set forth in order to provide a thorough understanding of the present invention. It will be evident, however, to one skilled in the art that the present invention may be practiced without the specific details. In other instances, well-known structures and devices are shown in block diagram form to facilitate explanation. The description of preferred embodiments is not intended to limit the scope of the claims appended hereto.

Features of the Invention

The present invention provides a user personalization service to businesses and organizations that provide document servers. In the preferred embodiment, the invention is directed primarily to e-commerce and Internet businesses. The invention can be used to provide personalization and Web user behavior (referred to herein as 'click stream') analysis. This service enables e-commerce and Internet sites to deliver highly personalized and relevant information to each of their users. The invention can be used with, but is not limited to, content sites and e-commerce sites.

Figure 1:
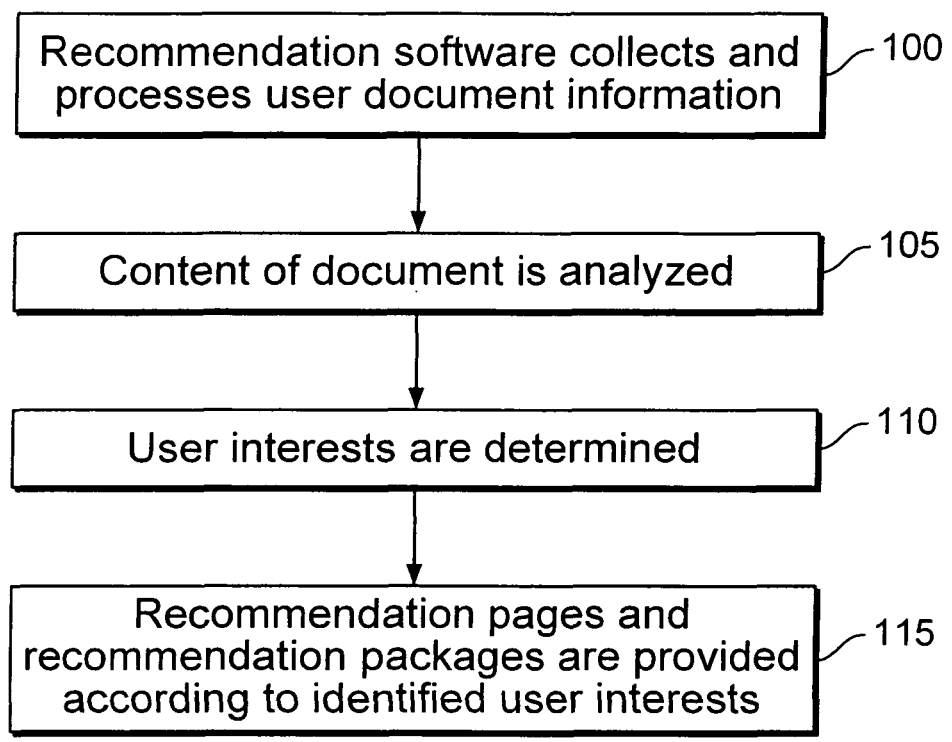
FIG. 1 is a flow diagram of the personalization method according to the present invention.

FIG. 1 is a flow diagram of the personalization method according to the present invention. The invention uses the recommendation software to remotely collect and process end user behavior 100. Each user action is considered and analyzed in terms of the structural content of the document that is actually viewed by the user 105. The interests of the user are determined 110 and the user can thereby be provided with a list of recommended documents that are selected according to the analysis of the content of the documents viewed by the user 115. In addition, the invention can also be used to generate a personalized recommendation package, such as, in the preferred embodiment, a personalized start page or a personalized product catalogue for each user.

The present invention is advantageous because, by having more relevant information delivered to each end user, the client can draw users back to the client document server and can create a barrier to their switching to a competing document server. This can result in increased advertising revenue accruing to the client, and e-commerce clients can receive more revenue from sales because each user will receive more relevant suggestions of products to buy and will return more regularly.

The invention offers significant advantages to clients over the prior art personalization methods. For example, using the invention, a personalized recommendation package can be rapidly deployed, with minimal effect on the original client document server during deployment. The present invention avoids the requirement for clients to develop and invest in complex techniques for their own tracking and personalization and is therefore more economical than prior art personalization schemes. In addition, the present invention will enable clients to retain customers through improved one-to-one interaction as well as drive revenue from increased sales through cross-selling and up-selling of their products.

Definitions

For purposes of this application, the present invention will be referred to as the 'recommendation system.' The use of the term recommendation system is in no way intended to limit the scope of the present invention as claimed herein. As described in further detail herein, the recommendation system can include any suitable and well-known hardware and software components, and in any well-known configuration to enable the implementation of the present invention.

The present invention is also implemented using one or more software applications that are accessible to the recommendation system. For purposes of this application, these software applications will be called the 'recommendation software.' The use of the term recommendation software is in no way intended to limit the scope of the present invention as claimed herein.

The personalization service according to the present invention is preferably provided by an entity, referred to for purposes of this application as the market analyst. The term 'client,' as used herein, refers to the operator of a document server. In the preferred embodiment of the present invention, the client is the operator/owner of a Web site. The term 'user' refers herein to an individual or individuals who view a document served by the client's document server.

The recommendation system can include the market analyst's computers and network system, as well as any software applications resident thereon or accessible thereto. For purposes of this application, these components will be collectively referred to as the 'marketing system.' The use of the term marketing system is in no way intended to limit the scope of the present invention as claimed herein. As described herein, the marketing system can include any suitable and well-known hardware and software components, and in any well-known configuration to enable the implementation of the present invention. In the presently preferred embodiment, the marketing system is maintained separately from the client document server. However, in alternative embodiments, the hardware and software components necessary to provide the personalization service can be a part of the client document server. In these alternative embodiments, the hardware and software components can be operated by, for example, a client e-commerce or Internet business itself.

The client's computers and network system, as well as any software applications resident thereon or accessible thereto will be collectively referred to, for purposes of this application, as the 'document server.' The term 'document' is used to represent the display viewed by a user. In a Web-based embodiment, the document is a Web page. In an e-mail embodiment, the document can be an e-mail message or listing of messages, such as an inbox.

As used herein, the term 'database' refers to a collection of information stored on one or more storage devices accessible to the recommendation system and recommendation software, as described previously. The use of the term database is in no way intended to limit the scope of the present invention as claimed herein.

The database according to the present invention can include one or more separate, interrelated, distributed, networked, hierarchical, and relational databases. For example, in the presently preferred embodiment of the invention, the database comprises a document database and a user database. The database can be created and addressed using any well-known software applications such as the Oracle 8™ database. The database according to the present invention can be stored on any appropriate storage device, including but not limited to a hard drive, CD-ROM, DVD, magnetic tape, optical drive, programmable memory device, and Flash RAM.

The term 'content sites' refers to Internet sites that are primarily providers of content based information such as news articles. Examples of content Web sites include CNET, MSN Sidewalk, and Red Herring. These sites can generate income from advertising, as well as syndication or referral fees for content. A content site's income can therefore be greatly dependent upon the Web site's ability to retain users.

E-commerce sites are Internet sites whose primary business is the sale of goods or services. E-commerce businesses derive revenue from the sale of goods on their Web sites. A significant factor in the success of an e-commerce Web site is the site's ability to attract and retain customers.

Syndicated content, as used herein, refers to other publisher's content that can be integrated into a client's document server.

Hardware Implementation

Any or all of the hardware configurations of the present invention can be implemented by one skilled in the art using well known hardware components. In the presently preferred embodiment, the present invention is implemented using a computer. Such computer can include but is not limited to a personal computer, network computer, network server computer, dumb terminal, local area network, wide area network, personal digital assistant, work station, minicomputer, and mainframe computer. The identification, search and/or comparison features of the present invention can be implemented as one or more software applications, software modules, firmware such as a programmable ROM or EEPROM, hardware such as an application-specific integrated circuit ('ASIC'), or any combination of the above.

Figure 2:
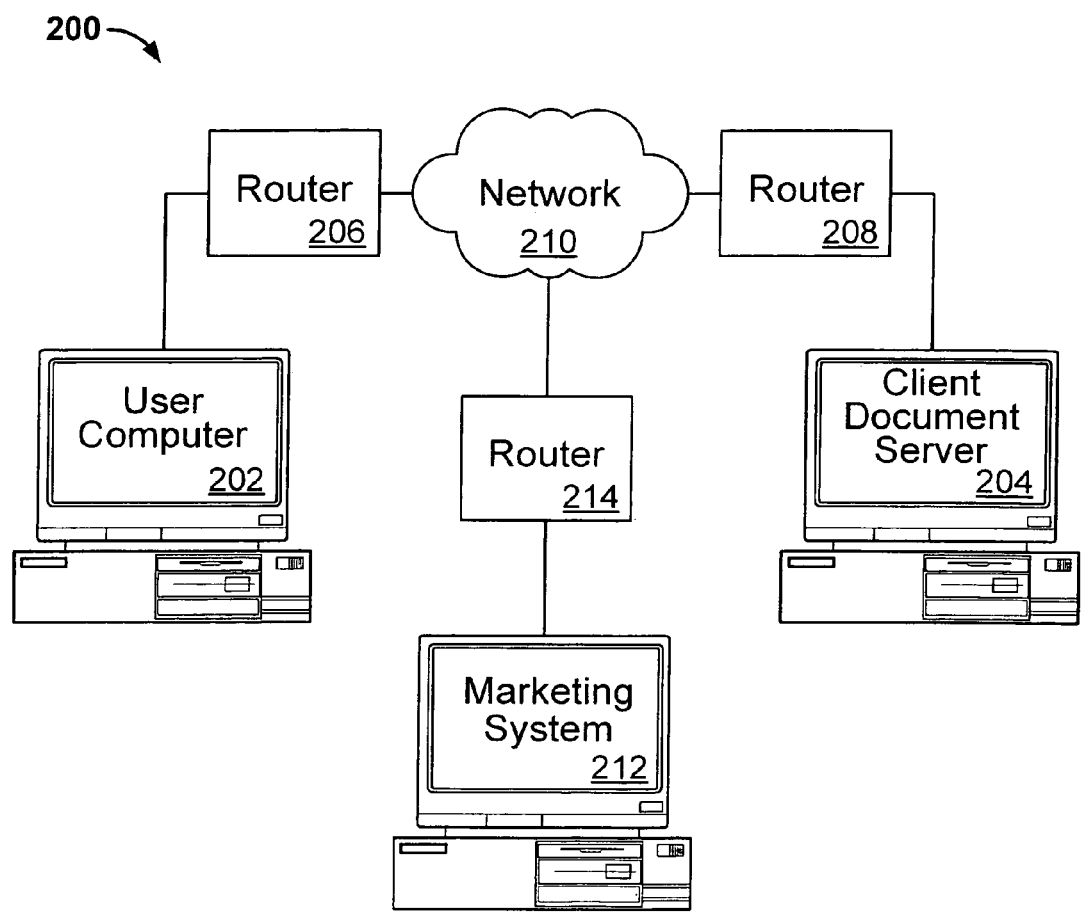
FIG. 2 is a block diagram of a computer network system according to one embodiment of the present invention.

FIG. 2 is a block diagram of a computer network system 200 according to one embodiment of the present invention. Any or all components of the recommendation system, the marketing system, the client document server, and the user's computer can be implemented using such a network system. In computer network system 200, at least one client document server computer 204 is connected to at least one user computer 202 and to at least one marketing system computer 212 through a network 210. The network interface between computers 202, 204, 212 can also include one or more routers, such as routers 206, 208, 214 that serve to buffer and route the data transmitted between the computers.

Network 210 may be the Internet, a Wide Area Network (WAN), a Local Area Network (LAN), or any combination thereof. In one embodiment of the present invention, the client document server computer 204 is a World-Wide Web ('Web') server that stores data in the form of 'Web pages' and transmits these pages as Hypertext Markup Language (HTML) files over the Internet network 210 to user computer 202. Similarly, the marketing system computer can also be a WWW server. Communication among computers 202, 204, 212 can be implemented through Web-based communication. In some embodiments of the present invention, computers 202, 204, and 212 can also communicate by other means, including but not limited to e-mail. It should be noted that a network that implements embodiments of the present invention may include any number of computers and networks.

Software Implementation

Any or all of the software applications of the present invention can be implemented by one skilled in the art using well known programming techniques and commercially available or proprietary software applications. The preferred embodiment of the present invention is implemented using an Apache Web server and Web-based communication. However, one skilled in the art will recognize that many of the steps of the invention can be accomplished by, alternative methods, such as by e-mail.

In the preferred embodiment of the invention, the operating system for the marketing system is Red Hat™ Linux®. However, any other suitable operating system can be used, including but not limited to Linux®, Microsoft Windows 98/95/NT, and Apple OS.

The recommendation software can include but is not limited to a Web server application for designing and maintaining the market analyst's Web site, a database application for creating and addressing the database, software filters for screening the content of documents served by the client's document server, a text clustering application, a text categorization program, a presentation module, a spider and/or search engine for seeking relevant documents, an e-mail application for communication with users, a spread sheet application, and a business application for verifying orders, credit card numbers, and eligibility of customers.

The recommendation software can include any combination of interrelated applications, separate applications, software modules, plug-in components, intelligent agents, cookies, JavaBeans™, and Java™ applets. The software applications that comprise the recommendation software can be stored on any storage device accessible to the marketing system, including but not limited to a hard drive, CD-ROM, DVD, magnetic tape, optical drive, programmable memory device, and Flash RAM. It will be readily apparent to one of skill in the art that the software applications can be stored on the same or different storage devices.

In the preferred embodiment of the invention, the clustering application is implemented using the C programming language. However, in alternative embodiments, the clustering application can be implemented using other well-known programming languages, including but not limited to C++, Pascal, Java, and FORTRAN. The clustering application is preferably stored on the marketing system, but can alternatively be stored on any component accessible to the marketing system.

In the preferred embodiment of the invention, the presentation module is implemented using Perl scripts and SQL. However, in alternative embodiments, the presentation module can be implemented in any other suitable programming language. The presentation module is preferably stored on the marketing system, but can alternatively be stored on any component accessible to the marketing system.

In the preferred embodiment of the invention, the tracking module that is associated with the client's document server is implemented using Perl scripts. However, in alternative embodiments, the tracking module can be implemented using other well-known programming languages and software applications including but not limited to TCL, Java™ servlet, and Microsoft Active Server Page ('ASP') applications. The tracking module is preferably stored on the client's document server, but can alternatively be stored on any component accessible to the document server.

In the preferred embodiment of the present invention, content analysis and the generation of the user profiles, recommendations, and recommendation packages are all performed by the marketing system and recommendation software. However, in alternative embodiments of the present invention, any or all of these functions can also be performed by the client document server. The client document server performs the functions of data collection, data transfer to the marketing system and presentation of the recommendations and recommendation packages to the user.

In the preferred embodiment of the invention, the database is implemented using Data Konsult AB's MySQL. However, in alternative embodiments, the tracking module can be implemented using other software applications including but not limited to Postgres, and Oracle® and Informix® database applications. The database is preferably stored on the marketing system server, but can alternatively be stored on any component accessible to the marketing system.

The recommendation software is preferably a separate application from the marketing system operating system. However, one skilled in the art will readily recognize that the present invention can also be fully integrated into the marketing system operating system.

Description of the Embodiments

Figure 3:
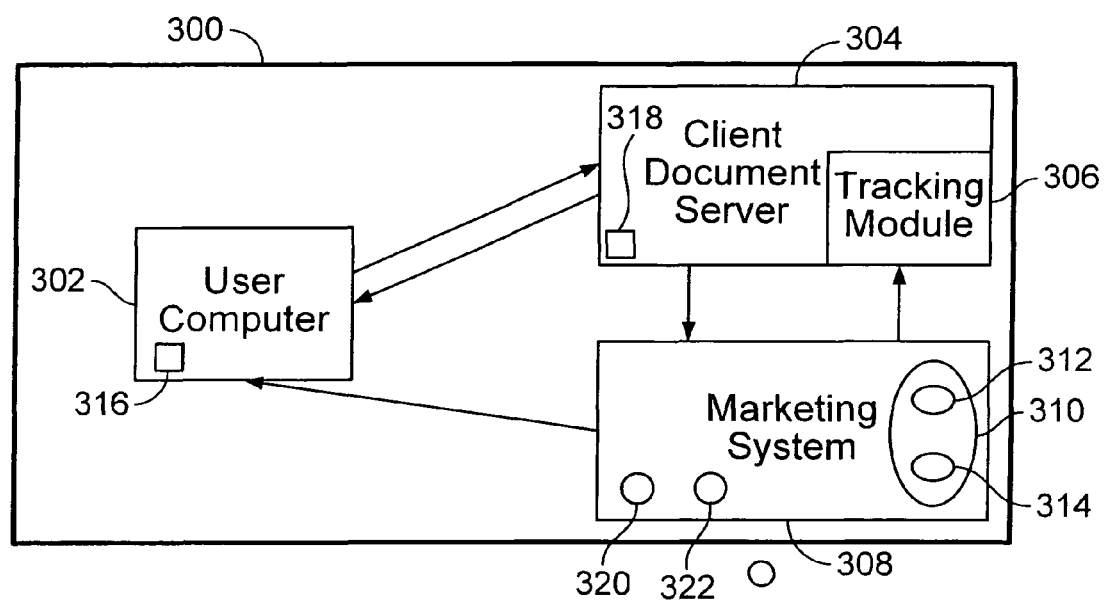
FIG. 3 is a diagram of the system for Internet personalization, according to the preferred embodiment of the invention.

FIG. 3 is a diagram of the system 300 for Internet personalization, according to the preferred embodiment of the invention. A tracking module 306 is installed at the client document server 304. In the presently preferred embodiment, a Web site manager embeds Hypertext Markup Language ('HTML') links to the marketing system in the client document server and, specifically, on the client document server's start page. While the tracking module is implemented as a Perl module embedded in Apache in the preferred embodiment, the tracking can alternatively be implemented in other ways, for example using hypertext links.

At the client document server 304, the tracking module logs every request made by every user for documents and sends this information to the database 310 associated with the marketing system 308. In the preferred embodiment of the present invention, the database 310 includes a document database module 312 for storing information relating to the document and contents of the document, and a user database module 314 for storing information relating to the user's document viewing behavior.

In the preferred embodiment, each user is sent a user-identifier ('user ID') 316 that is stored on the user's computer 302. The tracking module sends the user ID and a document identifier ('document ID') 318 to the marketing system 308 in response to each user's request to view a document on the client document server 304. The recommendation software 320 is then used to process this information to construct a profile for the user and to make recommendations based thereupon. In the preferred embodiment, the presentation module 322 is operable to configure a recommendation package for the user into any desired format or appearance.

Figure 4:
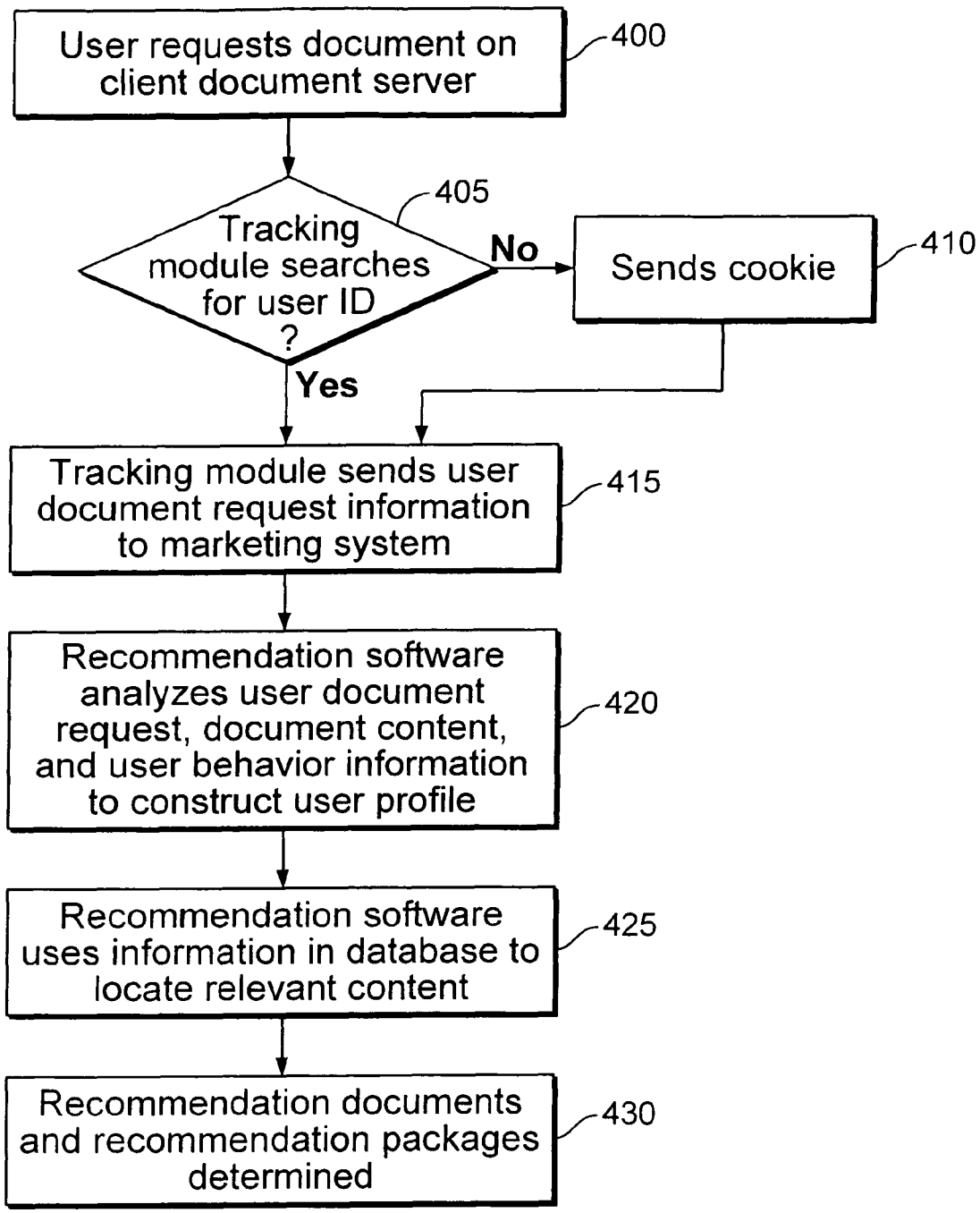
FIG. 4 is a flow chart of the method for Internet personalization, according to the preferred embodiment of the invention.

FIG. 4 is a flow chart of the method for Internet personalization, according to the preferred embodiment of the invention. A tracking module is installed at a client document server. In the preferred embodiment of the present invention, the client document server is a Web site. However, in alternative embodiments, the present invention is implemented with a client e-mail or File Transfer Protocol ('ftp') system.

In this preferred embodiment, when a user requests a document on the client document server 400, the tracking module searches for a user ID on the user's computer 405. If a user ID is not located, the tracking module creates a new entry in the database and sends a user ID to the user's computer 410. In the preferred embodiment, this involves sending a cookie to the user's Web browser. However, any other appropriate identifier can alternatively be used, such as an IP number.

The tracking module installed at the client document server logs every request made by every user for documents and sends this information to the marketing system. Thus, when the user requests a different document in the client's document server, the tracking module logs this action by sending the user ID and a document identifier ('document ID') to the database 415. In the presently preferred embodiment, the document ID is the URL of the particular Web page. However, other document IDs such as a product number can also be used.

In alternative embodiments of the present invention, the tracking module can send additional information, such as the time spent viewing a document and the price of items displayed on the document to the marketing system database. The subsequent actions on the client document server of any user who is entered in the marketing system database are similarly recorded in the marketing system database.

In yet another embodiment of the present invention, the marketing system can act as a proxy server. In this embodiment, the tracking module could be installed at either the marketing system or the client document server, or at both. In this embodiment, the user requests documents from the marketing system. In response to such request, the marketing system requests the appropriate documents from the client document server and provides them to the user.

In the preferred embodiment, documents and meta-data about the documents are stored in the document database module of the database. The document database can include other information obtained from the client, such as the price or size of an item. The user database module can include information obtained from the user, for example, whether the user placed a bid on an item, the user's name and address, which documents were viewed by the user, whether the user purchased an item, user profile or the time the user spent viewing a particular document. Information obtained from text analysis, document clustering, or document categorization can also be stored in the user database module.

As the user browses through the client's document server, the marketing system uses the recommendation software to process the user's behavior, analyze the content of the user's document views and construct a profile for the user 420.

The recommendation software uses the information in the user database to make a determination of what interests the particular user. For example a user who browsed an auction Web site for antique Roman coins and baseball cards would be determined to have two interests. These interests are determined by an analysis of the actual content of each browsed document.

The recommendation software uses any or all of the gathered information about the user to search through the content on the client's document server to find the local content considered most relevant to that particular user 425. In the preferred embodiment of the invention, the marketing system regularly retrieves the content for each document and/or product on the client document server, for example, once per hour.

The recommendation software analyzes each document a user views in terms of the (a) content and (b) ancillary information related to a user's viewing a document. The present invention uses this analysis of document content to provide a model for automatically deriving reasonable inferences regarding a user's interests and intentions in viewing particular documents. This model can then be used to generate a list of additional documents on the client document server, or elsewhere such as on another document server, that might be of interest to the user. These "recommendation documents" and "recommendation packages" provide a suggested product and/or document that is tailored to a user's interests and to the product and/or document that a user is currently viewing.

The marketing system sends the recommended document(s), or a link to the recommended document(s) back to the client's document server 430. The recommendations can include but are not limited to URLs, product numbers, advertisements, products, animations, graphic displays, sound files, and applets that are selected, based on the user profile, to be interesting and relevant to the user. For example, the most relevant ad for any page can be rapidly determined by comparing the current user profile with the description of the available advertisements.

The user recommendations can be provided as a part of a personalized recommendation package. In the preferred embodiment of the invention, the recommendation package is a personalized Web start page for the user. For an e-mail server-based embodiment, the recommendation package can be personalized e-mail. The recommendation package gives each end user a unique view of the client document server by showing information that is relevant to that user.

In the preferred embodiment, the document displayed to the user by the client document server includes a hypertext link that is used to access the personalized Web start page. When the user clicks on the hypertext link, the personalized start page is dynamically generated by the recommendation software at the marketing system. Each user will see a different view of the Web site based on the user's personal likes or dislikes, as determined automatically by the user's previous browsing behavior. Such automatic personalization minimizes the need for the client to specifically control document server content and permits the client to transparently provide information regarding the user's interests.

When the user clicks on a link to this personalized Web page on the client's document server, the personalized page is served to the user from the marketing system. Although the page is served from the marketing system, the presentation module is operable to configure the personalized page to conform to the client's own branding and image, thereby maintaining the look and feel of the client's site. In addition, the Uniform Resource Locator ('URL') link, which is the 'Web address' of the personalized page is configured to appear to be a link to the client document server.

In alternative embodiments of the present invention, the personalized Web page does not have to maintain the look and feel of the client's document server, but can have any desired appearance. In such embodiments, the presentation module is operable to configure the recommendation package into any desired format or appearance. Furthermore, there is no requirement that URL link provided to the user appear to link the Web page to any particular Web site. In one embodiment of the present invention, the user can switch back at any time to the from the personalized recommendation package, such as the personalized Web start page, to a non-personalized document, such as the generic start page of displayed by the client document server.

In another embodiment of the invention, portions of the client's document server can be mirrored on the marketing system. The recommendation software can then search through the mirrored client document server for content relevant to the particular user. The recommendation software can also optionally include syndicated content from the marketing system or from the client's syndication providers in the personalized page. New standards based on XML such as Information Content Exchange ('ICE') will facilitate the incorporation of syndication into Web sites.

The recommendation software according to the present invention uses information regarding the client's document server structure in the personalization analysis. For example, if a user typically looks at books in a particular category of a bookseller's Web site, this information will be used by the recommendation software, in addition to any content information, to create a personalized view of the site for the user.

Figure 5:
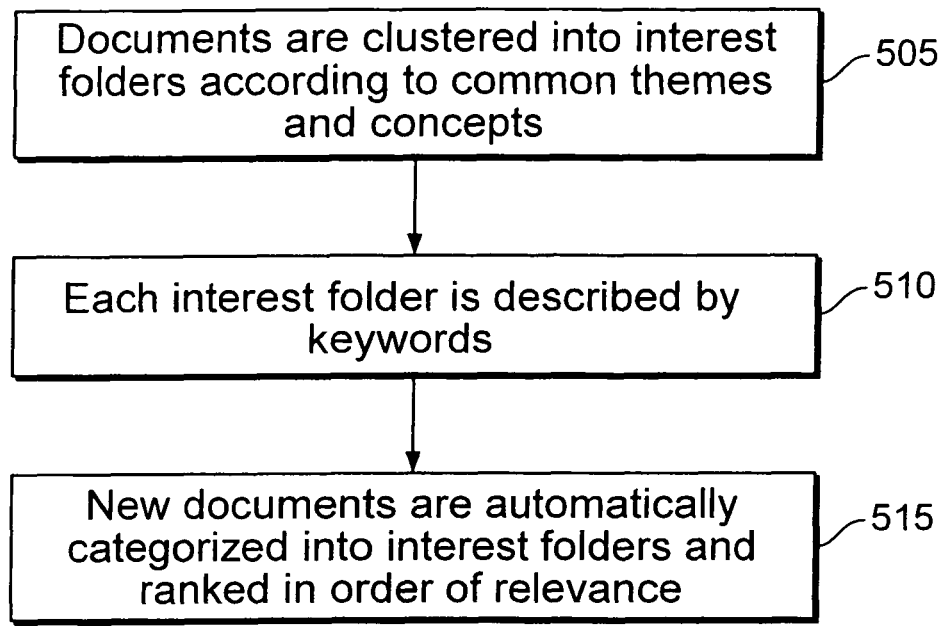
FIG. 5 is a flow chart illustrating the formation of interest folders, according to the present invention.

FIG. 5 is a flow chart illustrating the formation of interest folders, according to the present invention. The recommendation software thereby extracts and organizes the interests and document viewing habits of the user.

In the preferred embodiment of the invention, the recommendation software uses a statistical process referred to herein as document clustering to group together those documents of the client document server that have been viewed by the user according to their common themes and concepts. For each individual user, the recommendation software clusters those documents that have the most themes and concepts in common with one another into interest folders 505. In the preferred embodiment, the recommendation software continually monitors each user and continually updates the user's interest folders and profile.

The set of interest folders for each user can also be used to target advertisements to each user rather than, or in addition to content. In the presently preferred embodiment, each advertisement has an associated simple description. This description is specified by the creator of the ad. The description can be associated with the advertisement by methods including embedding in meta-language tags or in XML.

Document clustering according to the present invention includes the automatic organization of documents into the most intrinsically similar groups or segments. As an example of the application of using document clustering, a user who enters the search term 'Venus' into a search engine will likely receive documents about (a) Venus the planet; and (b) Venus the goddess. In the preferred embodiment of the present invention, the search results would therefore be clustered accordingly into two separate interest folders. None of the concepts in groups (a) and (b) are predefined but are formed as a result of the intrinsic similarity of the documents in each cluster. As a result, the clustering framework is very flexible for automatic organization of documents into groups.

In the preferred embodiment of the present invention, the recommendation software uses a proprietary clustering algorithm to form the user interest folders. The clustering algorithm uses the textual content of the documents viewed by a user, in combination with structural information about the document server, and ancillary information about the user to determine the interest folders for a user.

In an alternative embodiment, a clustering algorithm is also used to segment large numbers of users into different user folders. However, one skilled in the art would readily recognize that any other suitable clustering algorithm could also be used in alternative embodiments of the invention.

One significant feature of the clustering algorithm used by the invention is that the output of the algorithm can be readily viewed and understood. Each document cluster (interest folder) is described by the most relevant keywords of the documents within the document cluster 510. This feature enables both users and marketers to understand and control the degree of personalization and targeting that is made.

The recommendation software can also be used to categorize documents 515. Document categorization is the automatic placement of new documents into existing predefined categories. Document categorization is used in the preferred embodiment of the present invention to select, from a database, documents that match a user's interest folders. A document categorizer can learn how to place new documents into the correct categories so that, for example, a new Web page or product can be automatically placed into the correct user interest folder. As an example, given a user interest folder containing documents about Roman coins, a document categorizer could select the most relevant products for that user from a particular Web site.

Because Web pages are diverse in structure and form, the recommendation software uses customizable filters that extract only the content deemed to be relevant to users. In addition to extracting the content of each page, the recommendation software uses filters to extract structure within this content. The present invention can also use adaptive filtering algorithms that analyze a Web site and review different filter known structures to automatically find an appropriate filter for a particular Web site.

For example, an on-line bookseller's Web page can display information regarding a book that is available for purchase. The Web page can include such structure as: book price, author, description, and reviews. The fields of the document database are preferably customized to the bookseller's Web page such that the names of each of these fields can automatically be stored therein. The fields of the user database are similarly configured for automatic storage of information obtained from the user. This information is then included in the recommendation software's analysis.

In the preferred embodiment of the invention, the recommendation software uses proprietary filters that are specific for each Web site. For example, each of two music distribution Web sites would have its own specific customized filter. Alternatively, the recommendation software can use filters that are specific for different types of Web sites. As an example, the recommendation software can have separate specific filters for such sites as auction Web sites, bookseller Web sites, and music Web sites. One skilled in the art would recognize that the recommendation software can also use any suitable commercially available filters.

In the preferred embodiment, each interest folder is automatically summarized in terms of the most relevant keywords from the associated collection of pages in the folder. Keywords can be determined, for example, by using an information theoretic measure such as 'Minimum Message Length' ('MML') to determine the most relevant words to define a user's interest folder. Filters, such as the removal of 'stop-words,' can be used to screen out common prepositions, articles, possessives, and irrelevant nouns, adjectives, etc.

The keywords for a user's interest folders can be determined in any appropriate manner. In one embodiment of the invention, the message length of sending each word using the population frequency of the word is determined. This message length is referred to herein as the population message length of the word. The message length of sending each word using the interest folder's frequency of the word is then determined. This message length is termed herein the interest folder message length of the word. For each keyword, the interest folder message length of that keyword is then subtracted from the population message length of the word. The keywords for the user's interest folders are defined to be the words in which this distance is the greatest.

FIG. 6 is an example of a user profile 600 generated by the recommendation software, according to the preferred embodiment of the present invention. The profile shown in the personalized Web page of FIG. 6 comprises two different interest folders 602, 604 for a user of an on-line auction Web site. Each interest folder contains pages which are intrinsically similar to one another and dissimilar to pages in other interest folders.

A specific interest folder contains a set of links 610 to auctions the user has viewed that are related to the theme of the interest folder. An interest folder can also include additional information including but not limited to information regarding the history of the user's Internet viewing, recommendations for the user, a summary of the user's purchases. In the example illustrated in FIG. 6, each interest folder also has an associated set of keywords 612 that summarize the most important concepts of the particular interest folder, as determined by the recommendation software.

In the preferred embodiment of the present invention, the user can display and edit the user profile of FIG. 6. For example, if the user is no longer interested in Roman antiquities, this interest folder 612 can be deleted from the user profile.

It is common for a user to regularly return to particular Web sites to look for specific information having a similar theme. For example, a user of an on-line auction Web site who collects Roman coins might frequently return to the antiquities section of the auction Web site. The present invention uses the profile of each user to automatically find other relevant pages in the Web site to recommend to the user. In the previous example, the recommendation software would search through all of the auctions currently running on the on-line auction Web site to search for those auctions that match most closely with each of the user's interest folders.

The present invention uses a sophisticated search engine that can incorporate any or all of the content and ancillary information in the user profile. FIG. 7 is an example of a recommendation start page 700 according to the preferred embodiment of the present invention. The user's interest folders 602, 604 are displayed on the recommendation document. Each interest folder includes links to documents 610 that the recommendation software has selected based upon the user's profile. In the previous example of the Roman coin collector, the folder relating to this interest 604 includes links to auctions for Roman and other ancient coins.

In the preferred embodiment of the present invention, a user can view and manage the user's profile. Thus, in the previous example, the user may wish to remove certain sections of the profile in order to stop receiving recommendations about Roman coin auctions. The recommendation software user interface allows users to delete interest folders, add extra keywords to an interest folder, or create their own interest folder from pages on a client document server.

Because the user profiles are based primarily on keywords, the present invention can be used to not only target a user with content from the same Web site that the user is currently browsing, but also with content from other Web sites. For example, a user with an interest in collecting Roman coins could be automatically targeted with content from on-line publications related to antiquities.

While the present invention is designed to automatically match users with relevant content, it is recognized that a client might wish to customize the manner in which users receive special promotions, event announcements and special news items. In the example of the Roman coin collector, a marketer of cruises might wish to target the collector with a promotion for a cruise of the Mediterranean.

To enable marketers to interact easily with their users, the present invention provides the functionality to allow a marketer to search through the users' profiles using keywords in a standard search paradigm. Groups of users can be selected and then matched with relevant content either by hand or automatically using the present invention's content matching technology.

While the invention is described in conjunction with the preferred embodiments, this description is not intended in any way as a limitation to the scope of the invention. Modifications, changes, and variations which are apparent to those skilled in the art can be made in the arrangement, operation and details of construction of the invention disclosed herein without departing from the spirit and scope of the invention.

One skilled in the art will readily recognize that, in an embodiment that features Web-based interaction between the user, the market analyst, and the marketer, there are many different ways in which communication can be implemented through the Web page graphical user interface. For example, this communication can be implemented using elements including but not limited to a dialog box, check box, combo box, command button, list box, group box, slider bar, text box.

In the preferred embodiment of the present invention, all clients and users use computer-implemented methods to interact with the market analyst, for example, using a Web page or e-mail. However, in alternative embodiments, one or more such customers can communicate with the market analyst using other methods of communication, including but not limited to telephone, fax, and mail. For example, in one embodiment, a user can request modifications to the user's profile by making a telephone call to a client or to the market analyst.

What is claimed is:

1. A gateway apparatus for filtering electronic-mail messages according to a theme or concept of the electronic-mail messages, the gateway apparatus comprising:
  a first network interface configured to receive an incoming electronic-mail message;
  a memory configured to store user profiles, each user profile associated with a user and defining one or more user preferences concerning content of incoming electronic-mail messages, wherein the one or more user preferences are determined based on examination of content of one or more electronic-mail messages previously received by the user, wherein the one or more previously received electronic-mail messages were previously accessed by the user and stored by an electronic-mail server;
  a filter stored in memory and executable by a processor to:
    identify content of the incoming electronic-mail message, and
    determine that the content of the incoming electronic-mail message corresponds to a user profile defining one or more user preferences stored in memory; and
  a second network interface configured to transfer the incoming electronic-mail message to the electronic-mail server upon the determination that the incoming electronic-mail message corresponds to the one or more user preferences defined in the user profile, whereby the incoming electronic-mail message is accessible for display at a client device coupled to the electronic-mail server by the user indicated by the user profile.

2. The gateway apparatus of claim 1, further comprising an updateable storage device, and wherein the filter executable to identify the content of the incoming electronic-mail message is a customizable filter capable of being stored in the updateable storage device.

3. The gateway apparatus of claim 1, further comprising an updateable storage device, and wherein the user profile is customizable and capable of being stored in the updateable storage device.

4. The gateway apparatus of claim 3, wherein the user profile corresponds to a group of end-users.

5. A non-transitory computer-readable storage medium having embodied thereon a program, the program being executable by a processor to perform a method for personalized electronic-mail delivery, the method comprising:
  receiving an incoming electronic-mail message;
  identifying content of the incoming electronic-mail message;
  determining that the content of the incoming electronic-mail message corresponds to a user profile associated with a user, the user profile indicating one or more user preferences concerning content of incoming electronic-mail messages, wherein the one or more user preferences are determined based on examination of content of one or more electronic mail messages previously received by the user, wherein the one or more previously received electronic-mail messages were previously accessed by the user and stored by an electronic-mail server; and
  delivering the incoming electronic-mail message to the electronic-mail server upon the determination that the content of the incoming electronic-mail message corresponds to the one or more user preferences in the user profile whereby the incoming electronic-mail message is accessible for display to the user indicated by the user profile, the user accessing the electronic-mail server via a client computing device configured to display a list of electronic-mail messages that are stored at the electronic-mail server and accessible by the user.

6. A method for processing end-user behavior in an electronic-mail network for effectuating personalized delivery of electronic-mail, the method comprising:
creating a database entry in memory, the database entry regarding a user of an electronic-mail server, the user accessing the electronic-mail server via an electronic-mail client;
tracking user access to one or more electronic-mail messages stored at the electronic-mail server, the one or more electronic-mail messages previously received by the user;
filtering content information of the one or more previously received electronic-mail messages accessed by the user;
determining a user preference concerning content of incoming electronic-mail messages, the user preference determined based on examination of the filtered content information of the one or more electronic-mail messages previously received by the user; and
storing the determined user preference in the database entry regarding the user, the determined user preference being accessible for comparison against content of incoming electronic-mail messages.

7. The method of claim 6, wherein the content information is derived from textual information in the electronic-mail message.

8. The method of claim 6, wherein the content information is derived from graphics in the electronic-mail message.

9. The method of claim 6, further comprising creating a user profile for the user, the user profile indicating at least one preference of the user as reflected by the information stored in the database entry.

10. The method of claim 9, further comprising displaying to the user only those future electronic-mail messages that comprise content that corresponds to the at least one preference of the user as reflected by the user profile.

11. The method of claim 9 further comprising:
tracking subsequent requests by the user for access to one or more electronic-mail messages stored at the electronic-mail server;
storing additional information in the database entry for the user, the additional information regarding subsequent user access to the one or more electronic-mail messages, wherein the additional information comprises information derived from filtering the one or more electronic-mail messages for which the user subsequently requested access; and
updating the user profile including the at least one preference as reflected by the additional information stored in the user database entry.

12. The method of claim 6, wherein the filtering comprises extracting structure information from the electronic-mail message.

13. The method of claim 6, wherein the filtering comprises extracting one or more keywords from the electronic-mail message the keyword corresponding to a theme or concept of the electronic-mail message.

14. The method of claim 13, wherein the filtering further comprises extracting one or more terms irrelevant to the theme or concept of the electronic-mail message.

* * * * *